United States Patent
DiGiovanni et al.

[11] Patent Number: 5,898,811
[45] Date of Patent: Apr. 27, 1999

[54] MULTI-FIBER OPTICAL CABLE

[75] Inventors: David DiGiovanni, Montclair; Joseph E. Ford, Oakhurst, both of N.J.

[73] Assignee: Lucent Technologies, Inc., Murray Hill, N.J.

[21] Appl. No.: 08/787,489

[22] Filed: Jan. 22, 1997

[51] Int. Cl.⁶ .................................................. G02B 6/44
[52] U.S. Cl. ........................................... 385/126; 385/102
[58] Field of Search ........................... 385/100–114, 126, 385/128

[56] References Cited

U.S. PATENT DOCUMENTS

| | | | |
|---|---|---|---|
| 4,468,089 | 8/1984 | Brorein | 385/114 |
| 4,815,814 | 3/1989 | Ulijasz | 385/114 |
| 5,379,363 | 1/1995 | Bonicel et al. | 385/114 |
| 5,684,904 | 11/1997 | Bringuier et al. | 385/109 |

*Primary Examiner*—Hung N. Ngo

[57] ABSTRACT

A visually-distinguishable fiber pair in a shared coating, a method for making uncoated visually-distinguishable fiber, and a fiber-optic system using a visually-distinguishable fiber and a dark fiber in a shared coating are disclosed. To form the visually-distinguishable fiber, a marker is incorporated onto or into uncoated optical fiber. The marker can be applied to the cladding of the fiber, to a buffer layer disposed on the cladding layer, or integrated in a boule from which an optical fiber is drawn. In a further aspect, a marked fiber is paired with an unmarked fiber or a differently-marked fiber creating a visually-distinguishable fiber pair. The distinguishable paired fibers are then coated with plastic.

15 Claims, 3 Drawing Sheets

MULTI-FIBER OPTICAL CABLE

FIELD OF THE INVENTION

The present invention relates generally to optical fiber. More particularly, the present invention relates to improvements in optical fiber packaging.

BACKGROUND OF THE INVENTION

Conventional optical fiber cables have a multi-layer construction. At the center of an optical fiber cable is a transparent core. Typically made of glass, a single mode optical core has a diameter in the range of about 5–10 microns ($\mu$m). Multimode mode cores can be substantially larger. The optical core is surrounded by a concentric cladding, usually glass, that has an outer diameter that is typically about 125 $\mu$m. The cladding has a refractive index that is lower than the refractive index of the core. As a result, light energy is confined to the core region. The cladding, and encompassed optical core, are often referred to as "optical fiber," or "bare optical fiber."

For telecommunication applications, the bare optical fiber is covered by a protective coating. More specifically, the bare optical fiber is typically coated with a relatively soft inner layer, which is then overcoated with a hard external shell. Both of the layers are typically methacrylates characterized by different values of Young's Modulus. Such a dual coating provides a measure of strain relief and reduces the incidence of fiber breakage. The inner layer acts as a soft buffer to minimize microbending, while the outer layer functions as a protective shell. For a 125 micron diameter bare optical fiber, the inner coating layer is typically about 30 to 40 microns radial thickness. The outside diameter of the outer coating layer is about 250 microns.

In unprotected environments, one or more bare optical fibers are carried within a protective cable. The strength, complexity and cost of the cable depends on the environment. For example, an office environment "break out" cable consists of a plastic outer jacket, a layer of loose kevlar fiber for strain relief and padding, and a 900 micron diameter tight polyester buffer in contact with the bare fiber. In simplex cable, which carries a single optical fiber, the optical fiber itself represents only a small fraction of the total cost. Normal duplex cable, which consists of two simplex cables joined by a thin plastic bridge, is double the volume and costs about 75 percent more than simplex cable.

The cost of installing optical fiber can be large compared to the cost of the fiber itself. Therefore, when optical fiber is installed, such as within a building or between buildings, it is common to layer more fiber than is actually required for the intended application. This additional fiber is called dark fiber, because it does not initially carry an optical signal. The dark fiber might never be used. If, however, more lines are required at a later date, the dark fiber can be connected and used. Such an approach is cost effective because it avoids repeating the large expense of fiber installation.

Simplex fiber optic links are made with one fiber for both transmitted and received signals. Duplex fiber optic links, which use a separate fiber for the transmitted and received signals, offer advantages in signal intensity and noise levels. A network installation originally intended for simplex links could later be converted into a duplex network provided sufficient dark fiber is included during the initial installation. An optical fiber installation with more than double the initial fiber link requirements is therefore amenable to such an upgrade. Doubling the fiber count in an installation would, however, represent a significant increase in total cost.

As such, it would be desirable to provide a duplex optical fiber that lowers the cost of a duplex fiber link and reduces the cost associated with providing sufficient dark fiber for upgrading a simplex link to a duplex link.

SUMMARY OF THE INVENTION

A multi-fiber cable having at least two bare optical fibers within a shared overcoat, and methods for its manufacture, are disclosed. The multi-fiber cable includes at least two bare optical fibers that are coated with a buffer layer to prevent glass-on-glass contact that may result in breakage. The optical fibers with associated buffer layer are disposed within an overcoating.

Preferably, the fibers within the multi-fiber cable are visually-distinguishable from one another. Visual distinctiveness allows each fiber to be identified without sending an optical test signal. Moreover, dark fiber installation is simplified using visually-distinguishable fibers.

Visual distinguishability is accomplished by marking the fibers. In one exemplary embodiment, a buffer layer serves as the marker. In other exemplary embodiments, the bare optical fiber is marked, or the silica fiber preform from which the optical fiber is drawn is marked. The multi-fiber cable and the visually-distinguishable fibers are produced using methods known to those skilled in the art.

BRIEF DESCRIPTION OF THE DRAWINGS

Further features of the invention will become more apparent from the following detailed description of specific embodiments thereof when read in conjunction with the accompanying drawings, in which like elements have like reference numbers and in which.

DETAILED DESCRIPTION

Figure 1:
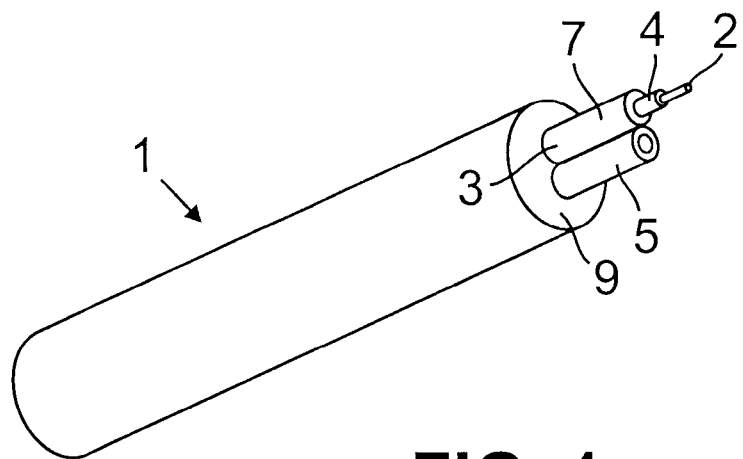
FIG. 1 is a perspective view of an illustrative embodiment of multi-fiber cable according to the present invention.

FIG. 1 shows an exemplary embodiment of a multi-fiber cable 1 according to the present invention. The cable 1 shown in FIG. 1 includes two bare optical fibers 3, 5, comprising a central transparent optical core 2 that is surrounded by a concentric cladding 4. A least one of the fibers 3, 5, and more preferably both of them, are coated by a buffer layer 7. The cable 1 further includes a shared overcoat 9 that coats both of the fibers 3, 5.

The buffer layer 7 prevents the two bare optical fibers 3, 5 from coming into direct physical contact. Such contact can cause scratches and pits in the surface of the fibers, especially if the fibers 3, 5 are glass. When the fibers are twisted or strained, such as will often occur during handling, the defects can grow and result in fiber breakage. It should be understood that if more than two fibers are present within the cable, all of the fibers except one, and more preferably all of the fibers, should be coated with the buffer layer 7 to prevent glass-on-glass contact.

The buffer layer 7 can be a plastic, such as, for example, methacrylate. The buffer layer should be about 30–40 microns in radial thickness.

The shared overcoat 9 provides an external, hard shell that protects the underlying fibers from damage by external factors. The shared overcoat 9 can be plastic, such as, for example methacrylate. It will be understood that if a plastic such as methacrylate is used for both the buffer layer 7 and the shared overcoat 9, the value of Young's modulus will be greater for the shared overcoat than for the buffer layer 7. Typically, the value of Young's modulus will be in the range of about 0.1 to about 10 megapascals for the buffer layer and in the range of about 30 to about 5000 megapascals for the shared overcoat. Preferably, the value of Young's modulus is about 1 megapascal for the buffer layer 7 and about 100 megapascals for the shared overcoat. The shared overcoat 9 should provide at least about 50 microns radial thickness beyond the buffer layer 7 of a fiber.

Figure 2A:
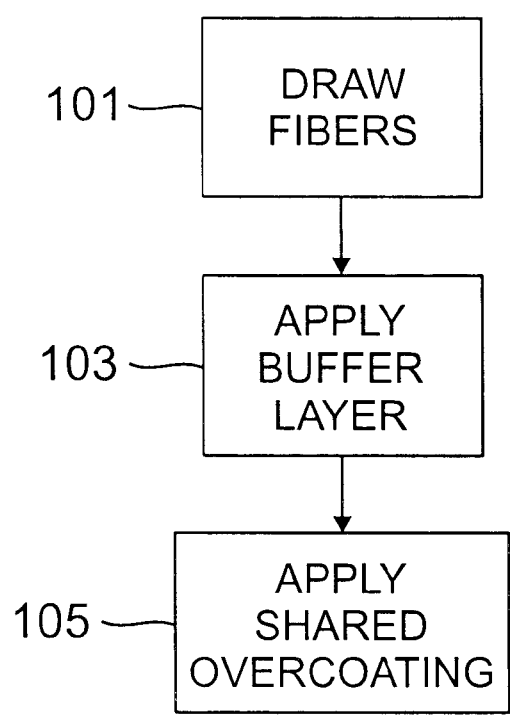
FIG. 2a is a flow diagram of a first exemplary embodiment of a method according to the present invention for forming the multi-fiber cable of FIG. 1.

The multi-fiber cable 1 can be formed according to a first exemplary embodiment that is illustrated by flow diagram in FIG. 2a. The manufacture of a two-fiber cable is described; it being understood that the method is applicable to more than two such fibers. First, as indicated in operation block 101, the two fibers 3, 5 are drawn from separate fiber preforms or boules. The step of drawing fiber is well known to those skilled in the art, e.g. heating the boule and applying a drawing force. At least one of the fibers 3 or 5 is then coated with the buffer layer 7 according to operation block 103. If the buffer layer 7 is plastic, then it can be applied by passing the fiber through a cup containing the coating material.

After the buffer layer 7 solidifies, the fibers are passed through a second coating step wherein both of the fibers are encased in a single shared overcoat 9, as indicated in operation block 105. The overcoat 9 can be applied by passing both of the fibers through a single cup containing the overcoat material, typically methacrylate. Passing the fibers through coating cups as described above is well known to those skilled in the art. Such a technique is utilized in conventional fiber manufacture for applying the inner and outer methacrylate coating layers.

The multi-fiber cable 1 is formed as the overcoat 9 dries. The multi-fiber cable 1 can then be spooled for storage.

It will be appreciated that the above-described method for forming multi-fiber cable 1 according to the present invention sacrifices independent drawing control of each fiber. A second exemplary embodiment of a method for forming multi-fiber cable that addresses this limitation is shown by flow diagram in FIG. 2b. In the second exemplary embodiment, rather than overcoating the fibers 3, 5 immediately after drawing and buffer coating as described above, the fibers 3 and 5 are drawn and buffer coated, and then overcoated in separate operations. Such a method allows the fibers to be drawn independently of one another, with the result that the production of each fiber can be optimized. For example, if the optimum drawing speed is different for each fiber, each fiber can be drawn at its optimum draw rate. Also, drawing the fibers separately reduces the complexity of the drawing equipment.

Figure 2B:
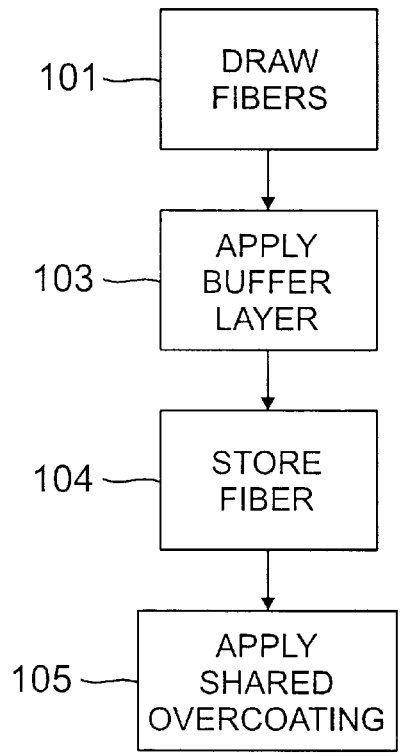
FIG. 2b is a flow diagram of a second exemplary embodiment of a method according to the present invention for forming the multi-fiber cable of FIG. 1.

It will be recognized by those skilled in the art that if the fibers are independently drawn according to the second exemplary embodiment, then the fibers intended for the cable 1 must be spooled for storage until all of such fibers are ready for overcoating, as shown in operation block 104 of FIG. 2b. The shared overcoating is then applied as indicated in operation block 105, such as by pulling the spooled fibers through an overcoating cup. To prevent damage to bare optical fiber, spooled fibers must possess the buffer layer 7. Thus the buffer layer application, operation block 103, must take place before spooling for storage. The buffer layer 7 must be thick enough to protect the fiber(s) during spooling, and hard enough that the spooled fibers do not stick together. A thickness of 30 to 40 microns of methyacrylate should be sufficient for protection. Routine experimentation can be performed to produce a suitably hard buffer layer 7. If one of the fibers intended for the cable 1 does not include the buffer layer 7, then that fiber should be drawn and then pulled through the overcoating cup as the spooled fibers are being pulled through the overcoating cup.

In the manufacture of conventional optical fiber cable having a single fiber within a jacket, the outer plastic coating can be colored. A plurality of such cables having different colored jackets may thus be distinguished by the jacket color. In the present invention, more than one fiber is present within the outer plastic coating, i.e., the shared overcoat 9. If those fibers are identical in manufacture, it would be necessary to use a test signal to distinguish them. As such, in preferred embodiments of the present invention, the fibers included within the shared overcoat 9 include a marker 11 that renders them visually distinguishable from one another.

In a first exemplary embodiment of a visually-distinguishable optical fiber 3a, the marker 11 is the buffer layer 7. In such an embodiment, the buffer layer 7 can be formed from a plastic having one of a variety of colors. The color can be imparted by adding a chemical dye to the plastic, such as is conventionally done in forming fiber ribbons. Routine experimentation determines the amount of dye required to result in sufficient color in the buffer layer 7. Alternatively, the buffer layer 7 can be a layer of metal, such as copper, having a thickness of a few microns. An optical fiber possessing such a metallic buffer layer will be visually distinguishable from a fiber possessing an uncolored buffer layer 7 or a fiber having a buffer layer characterized by a color other than that of the metal. The metal buffer layer 7 can be applied by drawing the bare optical fiber 3 through a cup containing a suitable molten metal.

Thus, for multi-fiber cables containing two optical fibers, i.e., duplex cables, a fiber having a colored or metallic buffer layer 7 is paired with a fiber having a transparent buffer layer, so that the fibers are visually distinguishable. For multi-fiber cables containing more than two fibers, a different color can be imparted to the buffer layer 7 associated with each such fiber so that all fibers are visually distinguishable. Optical fibers having a metallic buffer layer can be combined with the fibers having colored buffer layers as long as all of such fibers are distinguishable by appearance, i.e., color.

In a second exemplary embodiment of a visually-distinguishable optical fiber 3b, the marker 11 is a thin layer of metal that is deposited on the drawn fiber 3 before adding the protective buffer layer 7. In such a case, the buffer layer 7 is a clear plastic. The metal-coated fiber 3b is opaque, so that it is visually distinguishable from a buffer-coated fiber that does not include such a metal undercoating.

In a third exemplary embodiment of a visually-distinguishable optical fiber 3c, the marker 11 is a colored coating that is deposited on the drawn fiber 3 before adding the buffer layer 7. One way to deposit such a coating is based on a known process for hermetically sealing and protecting silica fiber. According to the process, as the fiber is drawn, it is passed through a chamber containing acetylene. The heat from the fiber exiting the drawing furnace thermally cracks the acetylene forming, on the bare optical fiber, a black coating having a thickness of about 0.2 microns. The black coating is visible through an appropriately formed buffer layer 7. A fiber 3c possessing such a coating is visually-distinguishable from other fibers not having such a coating.

Figure 3:
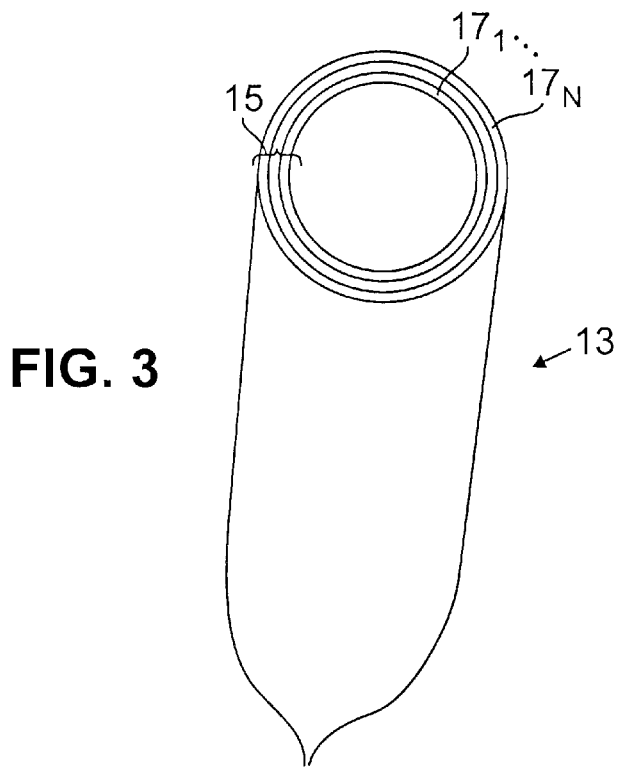
FIG. 3 is an illustration of a fiber preform having a dielectric coating.

In a fourth exemplary embodiment of a visually-distinguishable optical fiber 3d, the marker 11 is a dielectric coating formed in the fiber preform. Thus, the marker 11 is incorporated into the cladding of the fiber as it is drawn. For such an embodiment, a fiber preform 13 is produced that includes an outer region 15 having a plurality of layers $17_i$, where i=1–N. Such a fiber preform 13 is shown in FIG. 3.

Each layer $17_{1-N}$ in the boule has a thickness of about 1 millimeter. Layer thickness is set to result in layers having an optical thickness of approximately one-half wavelength in the drawn visually-distinctive optical fiber 3d. Such half-wave layers create optical interference effects. When a fiber 3d incorporating such layers is viewed, it will appear to have an iridescent, multi-hued "soap-bubble" type film around it. This visual effect is created by varying the refractive indices of adjacent layers, such as, for example, layers $17_i$, $17_{i-1}$ and $17_{i+1}$. For example, odd-numbered layers can have a refractive index about equal to that of an optical fiber core, while even-numbered layers can have a refractive index about equal to that of optical fiber cladding.

It will be appreciated that the difference in refractive index between the core and the cladding is relatively small, i.e., about 0.005. With such a small delta, more layers 17 would generally be required than if adjacent layers were provided with a larger difference in refractive index. A fiber preform 13 incorporating the layers $17_{1-N}$ can be formed by vapor axial deposition.

In a fifth exemplary embodiment of a visually-distinguishable optical fiber 3e, the marker 11 is a material that is incorporated as an outer layer on the fiber preform. The material imparts color to the cladding of the drawn fiber 3e. For example, if the fiber preform is made with a titanium-doped outer layer, and the fiber is drawn in a reducing atmosphere, the titanium will oxidize and turn black. Such a preform can be fabricated, for example, by surrounding a standard preform with a glass tube composed of titanium-doped glass. Titanium-doped glass can be formed by using a sol gel process, wherein a porous glass aerogel is immersed in a titanium solution, and then collapsed by heating into a solid glass.

Other markers that can render one optical fiber visually distinguishable from another but that will not affect the integrity of the bare optical fiber or its optical properties may suitably be used, as well.

It should be recognized that if the multi-fiber cable includes only two fibers, then only one of such fibers need be marked to distinguish one fiber from the other. More generally, if a number, n, of optical fibers are present within the cable, then n−1 fibers are preferably individually marked according to the present invention so that each of such n−1 fibers are distinguishable from each other and the unmarked fiber. The various embodiments of visually-distinguishable optical fiber described herein can be used in combination to provide a substantial number of visually-distinguishable fibers.

Thus, to form a multi-fiber cable including visually-distinctive optical fibers, the exemplary methods illustrated in FIGS. 2a and 2b incorporate one or more of the exemplary fiber marking methods described above.

Figure 4A:
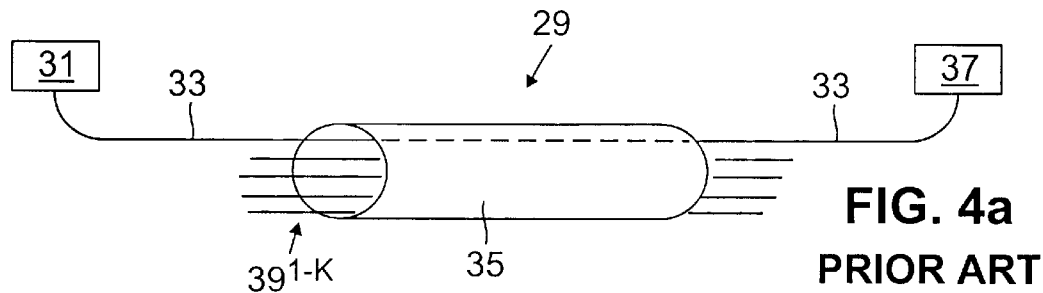
FIG. 4a shows a prior art fiber-optic system using a simplex connection.
Figure 4B:
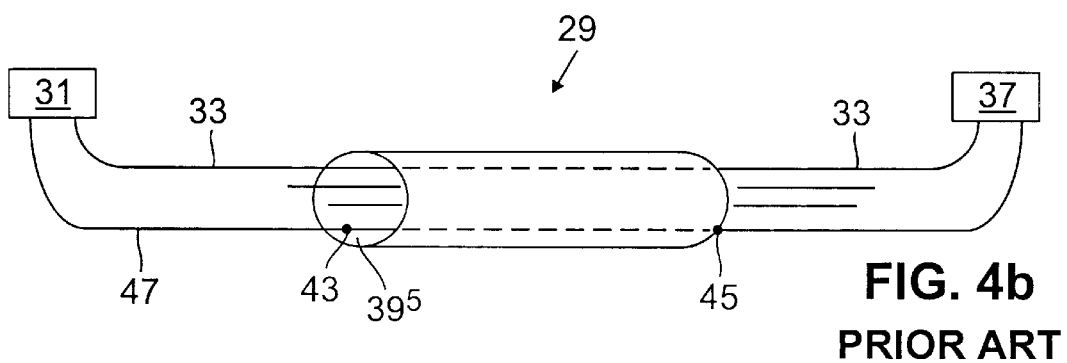
FIG. 4b shows a prior art fiber-optic system wherein a dark fiber is connected converting the simplex connection of FIG. 4a to a duplex connection.

In conventional fiber-optic systems, so-called "dark" fibers are sometimes included in trunk lines. Dark fibers are unconnected to an optical source. They are typically included in the trunk lines of such systems to provide for future capacity increases. FIGS. 4a and 4b illustrate using dark fibers in a conventional fiber-optic system 29.

As illustrated in FIG. 4a, a fiber 33 runs to a first terminal 31 in the system 29. The fiber 33 passes through a trunk line 35 and is connected to a second terminal 37. The trunk line includes a plurality of other fibers $39^{1-K}$, including a multiplicity of dark fibers $39^{1-G}$. FIG. 4b illustrates the conventional implementation of a second optical link, such as for conversion from simplex to duplex mode, or for adding an independent transmitter/receiver pair. As shown in FIG. 4b, a second fiber 47 can be connected to the first terminal, and then to a first end 43 of one of the dark fibers $39^{1-G}$ within the trunk line, for example, dark fiber $39^5$. A second end 45 of the dark fiber $39^5$ must then be located so that it may be placed in optical communication with the second terminal 37. In such a conventional system, to locate the second end 45 of the dark fiber $39^5$, an optical signal is launched into the second fiber 47. The second end 45 of the dark fiber may be identified by the presence of the signal.

Figure 5A:
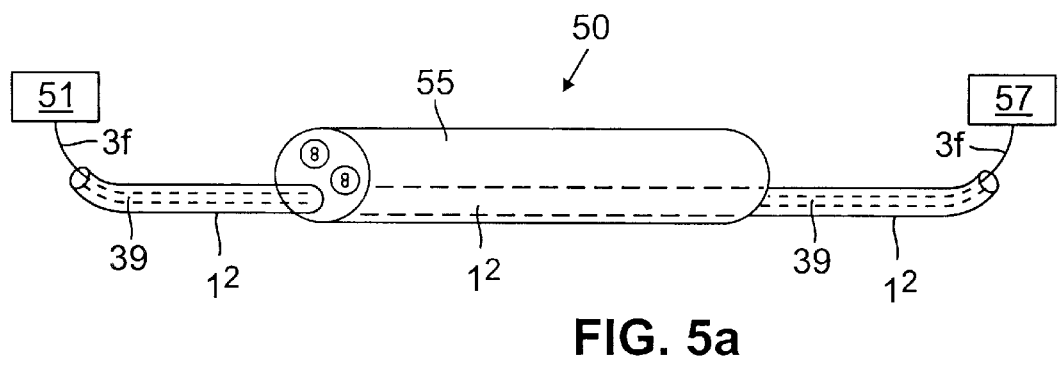
FIG. 5a illustrates a fiber-optic system according to the present invention incorporating a simplex connection.
Figure 5B:
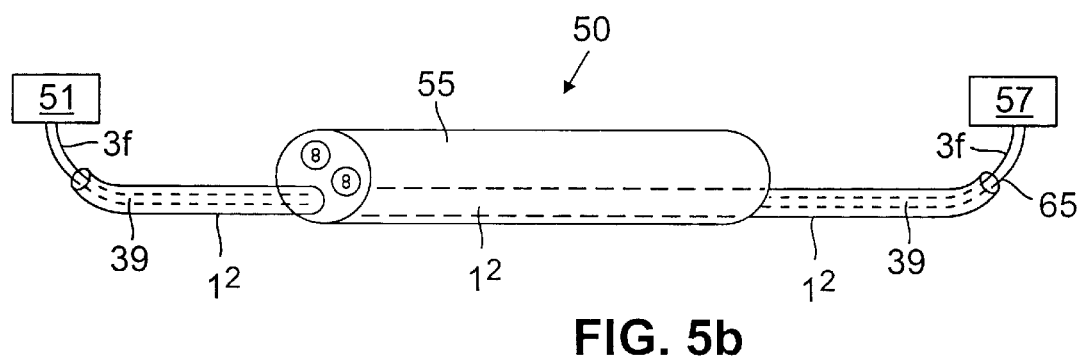
FIG. 5b illustrates a fiber-optic system according to the present invention wherein a dark fiber is connected converting the simplex connection of FIG. a to a duplex connection.

Identifying the second end of the dark fiber $39^5$ using a test signal is labor intensive. FIGS. 5a and 5b illustrate a fiber-optic system 50 according to the present invention that advantageously incorporates multi-fiber optical cable 1 to simplify activating a dark fiber.

As shown in FIGS. 5a and 5b, the fiber-optic system 50 comprises a plurality of multi-fiber cables $1^{1-N}$ according to the present invention. In a preferred embodiment, each multi-fiber cable 1 of the plurality contains two fibers, i.e., is a duplex-fiber cable. In preferred embodiments, each multi-fiber cable 1 is implemented in the fiber-optic system 50 to include a visually-distinguishable fiber $3f^1$ and one dark fiber 39 in a shared overcoat 9. The visually-distinguishable fiber $3f^i$ within any one of the N multi-fiber cables 1 is different from the visually-distinguishable fiber $3f^i$ within any other multi-fiber cable 1 of the plurality. Within each multi-fiber cable $1^{1-N}$, at least one of the fibers 3f or 39, and preferably both, are protected by the buffer layer 7. The visually-distinguishable fiber 3f may be embodied as any of the visually-distinguishable fibers 3a–3e previously described in this specification.

FIG. 5a shows a simplex connection, wherein a single fiber within the multi-fiber cable $1^2$, such as the visually-distinguishable fiber 3f, is connected to a terminal 51, runs through a trunk line 55, and is connected to a second terminal 57. Dark fiber 39 runs through the multi-fiber cable $1^2$. FIG. 5b shows a duplex connection, wherein two fibers with the multi-fiber cable $1^2$ are connected to terminals 51 and 57. Since the dark fiber 39 is paired with the visually-distinguishable fiber 3f within the multi-fiber cable $1^2$, a test signal is not required to identify a second end 65 of the dark fiber 39. Since a plurality of multi-fiber cables 1 are present, each of which may form a connection between unique elements of the fiber-optic system 50, incorporation of a visually-distinguishable fiber 3f facilitates the initial system connections.

It will be appreciated that the fiber-optic system 50 according to the present invention can have a wide variety of configurations, including, for example, a local area network (LAN), a wide area network (WAN), a telecommunication WAN that extends over a metropolitan area, or a localized network contained within a multibuilding campus, or a computer data network. The distinguishing feature of a fiber-optic system 50 according to the present invention is the inclusion of a plurality of multi-fiber cables 1, each of which includes at least one visually-distinguishable fiber and a dark fiber.

Multi-fiber cable 1 according to the present invention can be connected to other fibers by either single or multi-fiber connectors. To separate the optical fibers within the multi-fiber cable 1 for individual connection to other fibers, a length of the shared overcoating 9 is stripped away by mechanical or chemical action. For connection to a multi-fiber connector, a short length of the shared overcoating 9 is removed and two of the fibers, for example, can be inserted into a dual-fiber ferrule such as described in Ser. No. 08/688,178 filed Jul. 26, 1996 and incorporated herein by reference. Before inserting the fibers into the dual-fiber ferrule disclosed in the above referenced patent application, the buffer layer 7 should be stripped from each fiber.

Although specific embodiments of this invention have been shown and described herein, it is to be understood that these embodiments are merely illustrative of the many possible specific arrangements and methods that can be devised in application of the principles of the invention. Numerous other arrangements and methods can be devised in accordance with these principles by those of ordinary skill in the art without departing form the scope and spirit of the invention.

We claim:

1. A multi-fiber cable, comprising:
    a first bare optical fiber;
    a second bare optical fiber having a buffer layer disposed thereon; and
    a shared overcoat covering both the first and the second optical fiber, wherein the shared overcoat is disposed on the first bare optical fiber and on the buffer layer of the second bare optical fiber.

2. The multi-fiber cable of claim 1 wherein the buffer layer is plastic.

3. The multi-fiber cable of claim 1 wherein the shared overcoat is plastic.

4. The multi-fiber cable of claim 1 wherein the first and the second optical fiber are visually distinguishable from one another.

5. The multi-fiber cable of claim 4 wherein at least one of either the first or the second optical fiber has a marker so that the first optical fiber is visually distinguishable from the second optical fiber.

6. The multi-fiber cable of claim 5 wherein the first and the second bare optical fiber comprise a cladding surrounding an optical core, wherein the marker is disposed on the cladding.

7. The multi-fiber cable of claim 6 wherein the marker is the buffer layer.

8. The multi-fiber cable of claim 7 wherein the buffer layer is metallic.

9. The multi-fiber cable of claim 7 wherein color is imparted to the buffer layer.

10. The multi-fiber cable of claim 6 wherein the marker comprises a metallic layer disposed on the cladding beneath the buffer layer, wherein the buffer layer is substantially transparent.

11. The multi-fiber cable of claim 6 wherein the marker comprises a colored layer disposed on the cladding beneath the buffer layer, wherein the buffer layer is substantially transparent.

12. The multi-fiber cable of claim 5 wherein the first and the second bare optical fiber comprise a cladding surrounding an optical core, wherein at least a portion of the cladding is the marker.

13. The multi-fiber cable of claim 5 wherein the first and the second bare optical fiber comprise a cladding surrounding an optical core, wherein color is imparted to the cladding.

14. An optical cable comprising:
    a plurality of bare optical fibers, n in number,
    a buffer layer disposed on at least n−1 of the bare optical fibers;
    n−1 markers, each one unique, for the n−1 fibers having the buffer layer; and
    a shared overcoat that covers the plurality of optical fibers, the shared overcoat being disposed on the buffer layer of the n−1 fibers.

15. The optical cable of claim 14, wherein the n−1 markers are n−1 different colors that are imparted to the buffer layer of each of the n−1 fibers, one color to each buffer layer.

* * * * *